United States Patent
Shah et al.

(10) Patent No.: US 12,393,463 B2
(45) Date of Patent: Aug. 19, 2025

(54) SEQUENTIALLY RESTARTING INDEPENDENT WORKLOADS ACROSS DISTRIBUTED CLOUD ENVIRONMENT

(71) Applicant: INTERNATIONAL BUSINESS MACHINES CORPORATION, Armonk, NY (US)

(72) Inventors: Dhyey Shah, Apex, NC (US); Ratnakar Asara, Fuquay-Varina, NC (US); Mihir Rohit Shah, Holly Springs, NC (US); Paul Brian Tippett, Raleigh, NC (US); Tam Stangler, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 17/980,808

(22) Filed: Nov. 4, 2022

(65) Prior Publication Data

US 2024/0152398 A1    May 9, 2024

(51) Int. Cl.
*G06F 9/50* (2006.01)
*G06F 8/65* (2018.01)
*G06F 9/48* (2006.01)

(52) U.S. Cl.
CPC .............. *G06F 9/5038* (2013.01); *G06F 8/65* (2013.01); *G06F 9/4843* (2013.01);
(Continued)

(58) Field of Classification Search
None
See application file for complete search history.

(56) References Cited

U.S. PATENT DOCUMENTS 9,183,049 B1 * 11/2015 Corley .................... G06F 9/505
9,311,162 B2    4/2016 Dehaan
(Continued)

FOREIGN PATENT DOCUMENTS

CN    107070686 A    8/2017
CN    110262871 A    9/2019
(Continued)

OTHER PUBLICATIONS

Anonymous, "About IBM Blockchain Platform for IBM Cloud", IBM Cloud Docs, downloaded from the internet on Oct. 28, 2022, <https://cloud.ibm.com/docs/blockchain?topic=blockchain-ibp-console-overview#ibp-console-overview>, 17 pages.
Anonymous, "Blockchain Platform", IBM Cloud, Date of last update: Jul. 6, 2022, <https://cloud.ibm.com/catalog/services/blockchain-platform>, 1 page.
Anonymous, "IBM / multi-cluster-app-dispatcher", <https://github.com/IBM/multi-cluster-app-dispatcher>, 4 pages.
Anonymous, "kubernetes-sigs / kueue", <https://github.com/kubernetes-sigs/kueue>, 4 pages.
(Continued)

*Primary Examiner* — Abu Zar Ghaffari
(74) *Attorney, Agent, or Firm* — Monchai Chuaychoo

(57) ABSTRACT

An approach for managing workload deployment, specifically, restarting workloads that are interdependent is provided. The approach includes a mechanism by which a group of interdependent workloads in a cloud infrastructure environment can be restarted sequentially. Interdependent workloads simply mean workloads that depend on each other in some way such that if one goes down, then the cloud infrastructure environment can experience downtime. The workloads can be of the same or different types. Additionally, this mechanism can be scaled such that groups of workloads can be restarted simultaneously. Furthermore, the approach can accommodate cloud infrastructure environments with multiple types of workloads, and it allows for groups of workloads to be restarted simultaneously while also allowing the workloads within each group to be restarted sequentially.

17 Claims, 8 Drawing Sheets

(52) U.S. Cl.
CPC .......... *G06F 9/4881* (2013.01); *G06F 9/5005* (2013.01); *G06F 9/5072* (2013.01); *G06F 2209/501* (2013.01); *G06F 2209/5022* (2013.01)

(56) References Cited

U.S. PATENT DOCUMENTS

| | | | |
|---|---|---|---|
| 9,787,598 B2 | 10/2017 | Bertram | |
| 10,496,692 B1 | 12/2019 | Kahrs | |
| 2017/0371709 A1* | 12/2017 | Harper | G06F 9/505 |
| 2018/0018610 A1* | 1/2018 | Del Balso | G06N 3/08 |
| 2018/0332138 A1* | 11/2018 | Liu | H04L 41/5041 |
| 2020/0310870 A1* | 10/2020 | Delpech | G06F 9/4881 |
| 2020/0319909 A1* | 10/2020 | Jawahar | G06F 9/455 |
| 2021/0132993 A1* | 5/2021 | Chiplunkar | G06F 9/321 |
| 2021/0326177 A1* | 10/2021 | Vasudevan | G06F 9/52 |
| 2023/0093884 A1* | 3/2023 | Quinn | G06F 9/5027 709/226 |

FOREIGN PATENT DOCUMENTS

| | | |
|---|---|---|
| CN | 110677275 A | 1/2020 |
| CN | 114553870 A | 5/2022 |
| EP | 2812799 B1 | 5/2021 |

OTHER PUBLICATIONS

Anonymous, "Manage a rolling restart in Splunk Cloud Platform", Splunk, Splunk Cloud Platform, Version 8.2.2109, downloaded from the internet on Sep. 1, 2022, <https://docs.splunk.com/Documentation/SplunkCloud/8.2.2109/Admin/RollingRestart>, 5 pages.

Anonymous, "Openshift: trigger pods restart sequentially", Stack Overflow, downloaded from the internet on Sep. 1, 2022, <https://stackoverflow.com/questions/48621726/openshift-trigger-pods-restart-sequentially>, 2 pages.

Anonymous, "Perform a rolling restart of an indexer cluster", Splunk, Splunk Enterprise, Version 8.2.3, downloaded from the internet on Sep. 1, 2022, <https://docs.splunk.com/Documentation/Splunk/8.2.3/Indexer/Userollingrestart>, 9 pages.

Anonymous, "What's new", IBM Documentation, Last Updated: Jul. 22, 2022, <https://www.ibm.com/docs/en/blockchain-platform/2.5.3?topic=253-whats-new>, 1 page, Grace Period Disclosure.

Mell et al., "The NIST Definition of Cloud Computing", National Institute of Standards and Technology, Special Publication 800-145, Sep. 2011, pp. 1-7.

Rainville, Shane, "How to Restarting Kubernetes Pods", CloudyTuts, Published: Aug. 24, 2020, <https://www.cloudytuts.com/tutorials/kubernetes/how-to-restarting-kubernetes-pods/>, 5 pages.

\* cited by examiner

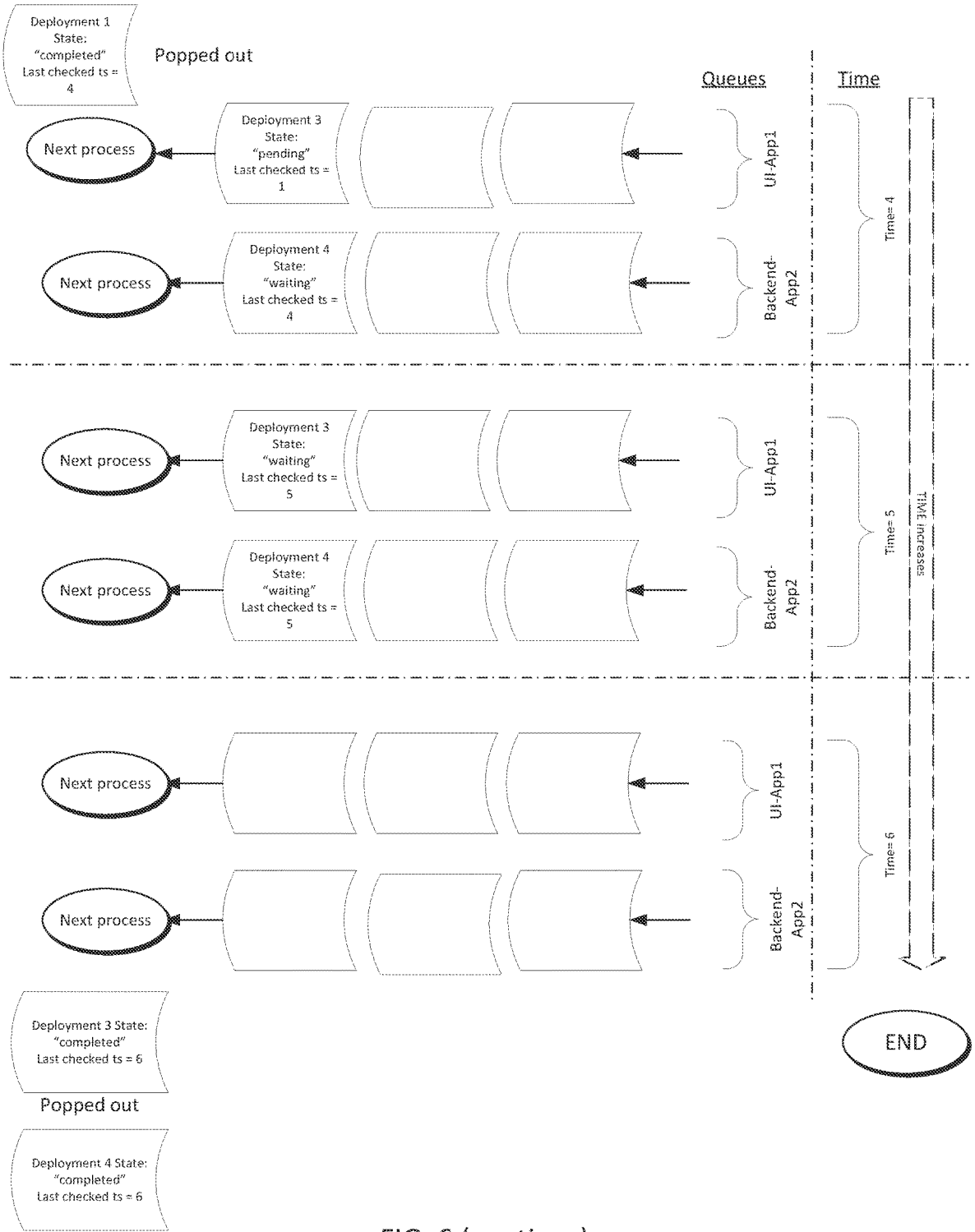
FIG. 6 (continue)

US 12,393,463 B2

SEQUENTIALLY RESTARTING INDEPENDENT WORKLOADS ACROSS DISTRIBUTED CLOUD ENVIRONMENT

The following disclosure(s) are submitted under 35 U.S.C. 102(b)(1)(A) as prior disclosures by, or on behalf of, a sole inventor of the present application or a joint inventor of the present application:

1) Released on Nov. 15, 2021 as a new feature of an existing blockchain platform implementation (www.ibm.com) and source code release on Jun. 9, 2022.

TECHNICAL FIELD

The present invention relates generally to the field of distributed networks, and more particularly to managing workload in a distributed network.

BACKGROUND

Containers are either operating system-level virtualization or application-level virtualization that runs over multiple network resources. This virtualization allows software applications to run in an isolated user space. The containers can be deployed in a cloud or non-cloud environment. Essentially, the containers are a fully functional (as well as portable) computing environment (e.g., cloud or non-cloud) that encapsulates the application and keeping it independent from other running environments which could be running parallelly.

SUMMARY

Aspects of the present invention disclose a computer-implemented method, a computer system and computer program product for managing workload deployment in one or more server clusters. The computer implemented method may be implemented by one or more computer processors and may include: receiving one or more requests for a restart for deployment associated with the one or more server clusters; grouping the one or more requests based on a first label of a one or more labels to one or more deployment queues; determining whether a first queue of the one or more deployment queues exist that matches with the first label; responsive to the first queue does exist then assigning the one or more grouped requests to the first queue; responsive to the first queue does not exist then creating a second queue based on the first label and assigning the one or more grouped requests to the second queue; determining number of requests of the one or more requests in the first queue that can be restarted concurrently meets a concurrent threshold value; in response to the number of requests does meet the concurrent threshold value, popping the one or more requests from the one or more deployment queues; in responsive to the number of requests does not meet the concurrent threshold value, assigning the one or more requests to start sequentially; processing the one or more requests from the first queue and/or second queue based on status and a timestamp of the one or more requests; and updating a restart configmap file based on the status of the one or more requests.

According to another embodiment of the present invention, there is provided a computer system. The computer system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which.

DETAILED DESCRIPTION

Introduction

Figure 1:
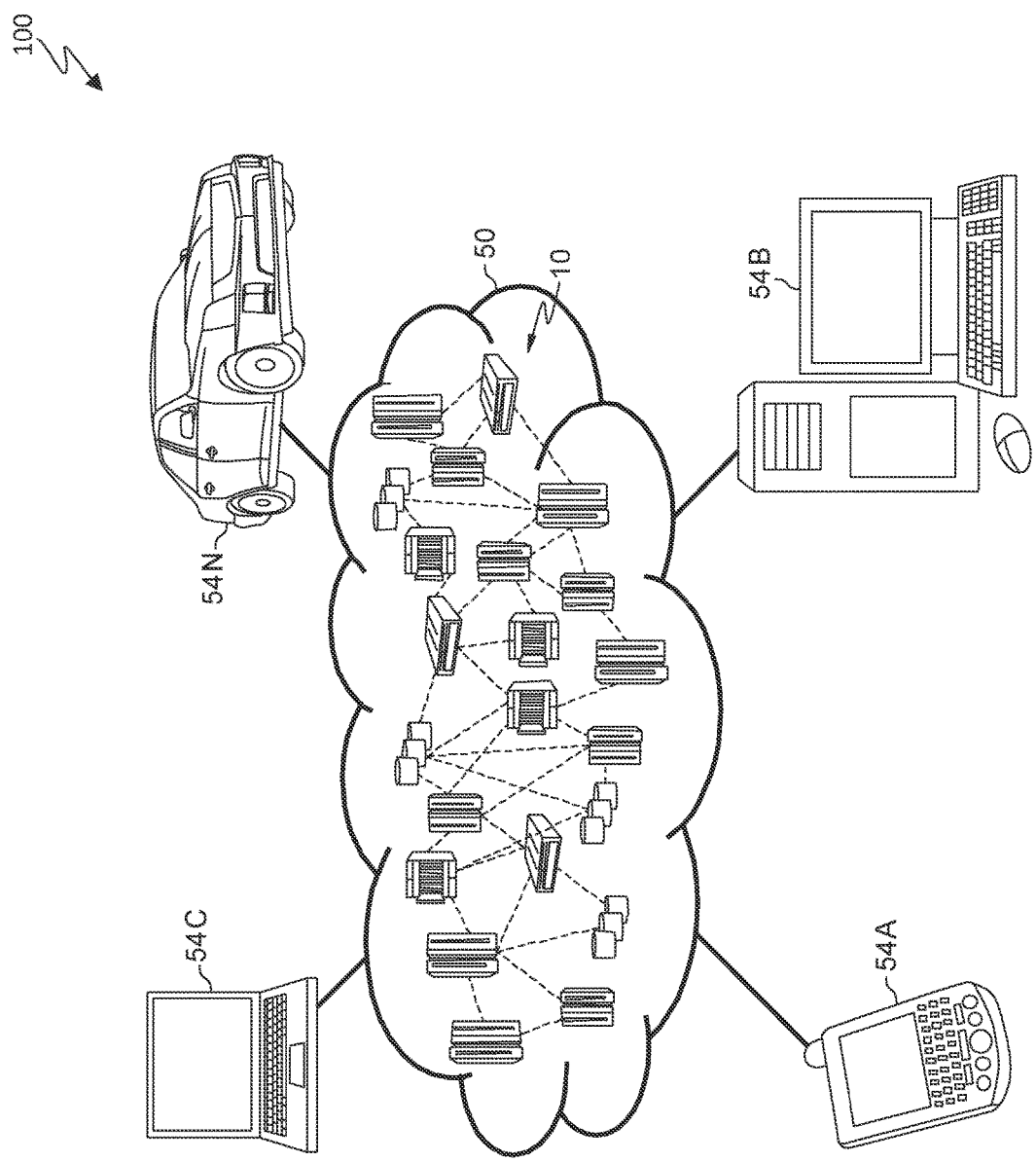
FIG. 1 depicts an embodiment of a cloud computing environment (also called the "first embodiment system") according to the present invention.

In a typical cloud infrastructure environment, there can be multiple workloads running. When new updates or fixes need to be pushed out to the workload, generally they are done using a rollout restart. A rolling restart means that a new workload will be created before the old workload is scaled down in order to minimize downtime for that particular workload. For example, in a Kubernetes environment, the deployment completes a rollout restart by restarting the pods that comprise the deployment one at a time, or it will restart a few replicas at a time of the deployment. This ensures that the deployment does not sustain any downtime. A more brute-force approach to restarting a workload would be to simply terminate the existing workload such that the cloud infrastructure environment detects the change in state and starts up another workload to replace the terminated one. Furthermore, existing rollout restart mechanisms only manages the restart of workloads independent of each other. In other words, using a rollout restart simultaneously on unrelated workloads should not cause any "downtime" as defined by the context of the environment and its workloads. It is noted that the term. "Kubernetes" and any derivations of the term that appears throughout this disclosure is a registered trademark of The Linux Foundation in the United States of America.

Embodiments of the present invention provides an approach for managing workload deployment, specifically, restarting workloads that are interdependent, where simultaneously restarting all of them would put the environment in an unfavorable state, such as downtime. The approach includes a mechanism by which a group of interdependent workloads in a cloud infrastructure environment can be restarted sequentially. Interdependent workloads simply mean workloads that depend on each other in some way such that if one goes down, then the cloud infrastructure environment can experience downtime. The workloads can be of the same or different types. Additionally, this mechanism can be scaled such that groups of workloads can be restarted simultaneously. Furthermore, the approach can accommodate cloud infrastructure environments with multiple types of workloads, and it allows for groups of workloads to be restarted simultaneously while also allowing the workloads within each group to be restarted sequentially. Although this invention can be applied to any cloud infrastructure environment, the illustration and case scenario provided of the invention will pertain to a Kubernetes environment.

Other benefits and advantages of the embodiment of the present invention can include, but it is not limited to, i) The queue creation and parallel processing of those queues makes the restart process more efficient and faster and ii) the staggered restarts of members of a queue makes sure that there is no downtime when rolling out the updates or restarting them.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Hardware and Software Environment

Cloud computing is a model of service delivery for enabling convenient, on-demand network access to a shared pool of configurable computing resources (e.g., networks, network bandwidth, servers, processing, memory, storage, applications, virtual machines and services) that can be rapidly provisioned and released with minimal management effort or interaction with a provider of the service. This cloud model may include at least five characteristics, at least three service models and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth and active user accounts). Resource usage can be monitored, controlled and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems or storage, but has control over the deployed applications and possibly application hosting environment configurations.

Infrastructure as a Service (IaaS): the capability provided to the consumer is to provision processing, storage, networks and other fundamental computing resources where the consumer is able to deploy and run arbitrary software, which can include operating systems and applications. The consumer does not manage or control the underlying cloud infrastructure but has control over operating systems, storage, deployed applications and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community or public) that remain unique entities but are bound together by standardized or proprietary technology that enables data and application portability (e.g., cloud bursting for load-balancing between clouds).

A cloud computing environment is service oriented with a focus on statelessness, low coupling, modularity and semantic interoperability. At the heart of cloud computing is an infrastructure that includes a network of interconnected nodes.

Embodiments of the present invention will now be described in detail with reference to the Figures. It should be noted that references in the specification to "an exemplary embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure or characteristic is described in connection with an embodiment, it is submitted that it is within the knowledge of one skilled in the art to affect such feature, structure or characteristic in connection with other embodiments whether or not explicitly described.

FIG. 1 illustrates a cloud computing environment according to an embodiment of the present invention, designated as 100. As shown, illustrative cloud computing environment 50 comprises one or more cloud computing nodes 10 with which local computing devices used by cloud consumers, such as, for example, personal digital assistant (PDA) or cellular telephone 54A, desktop computer 54B, laptop computer 54C and/or automobile computer system 54N may communicate. Computing nodes 10 may communicate with one another. They may be grouped (not shown) physically or virtually, in one or more networks, such as Private, Community, Public or Hybrid clouds as described hereinabove or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
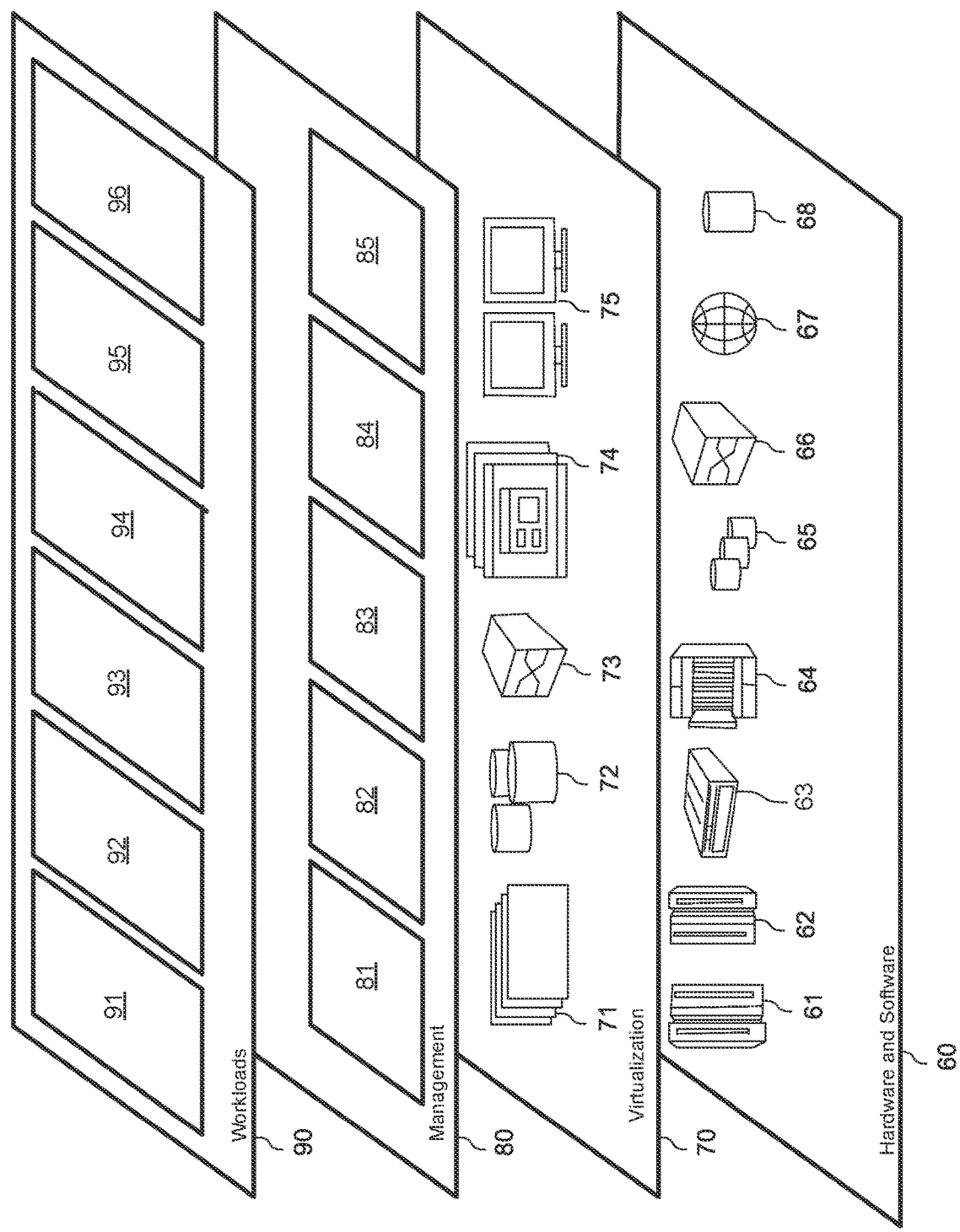
FIG. 2 depicts abstraction model layers used in the first embodiment system.

FIG. 2 illustrates abstraction model layers according to an embodiment of the present invention and comprises a set of functional abstraction layers provided by cloud computing environment 50 (FIG. 1). It should be understood in advance that the components, layers and functions shown in FIG. 2 are intended to be illustrative only and embodiments of the present invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85, provide pre-arrangement for and procurement of cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workload management 96. Functionality and subcomponents of workload management 96 will be described in greater details as it relates to FIG. 4.

Figure 3:
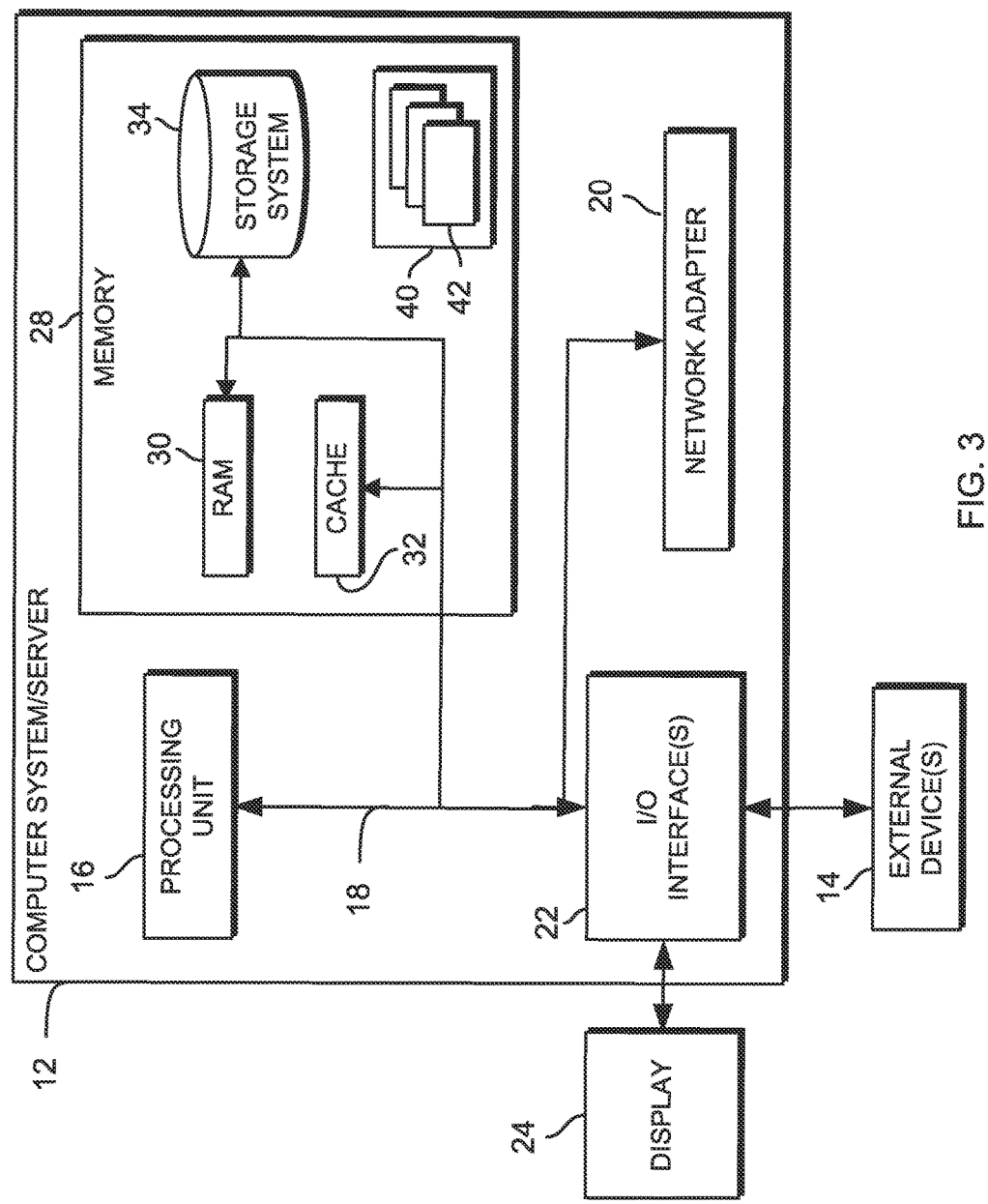
FIG. 3 depicts a cloud computing node used in a first embodiment of a system according to the present invention.

FIG. 3 illustrates a cloud computing node according to an embodiment of the present invention. In example cloud computing node 10, is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set of one or more program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

DETAILS OF EMBODIMENTS

Figure 4:
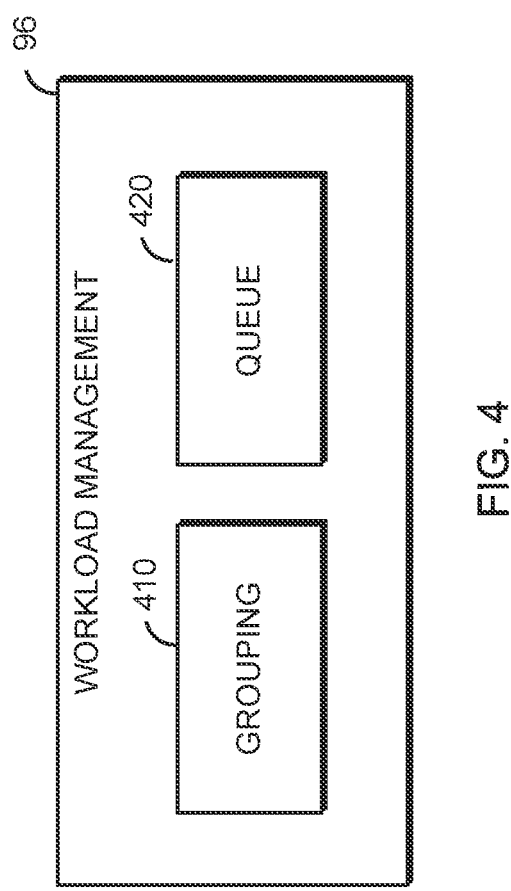
FIG. 4 illustrates a functional block diagram along with subcomponent/modules (e.g., of a workload management 96, in accordance with an embodiment of the present invention.

FIG. 4 illustrates a functional block diagram of a workload management 96, in accordance with an embodiment of the present invention. In the depicted embodiment, workload management 96 contains several submodules such as, but is not limited to Grouping 410 and Queue 420. It is noted that the subcomponents of workload management 96 will be described from the perspective of a Kubernetes environment. However, the functionality and capability can be applicable and/or implemented onto other platforms.

Grouping 410:

As is further described herein below, Grouping 410 has the capability of detecting and defining the grouping for components that are interdependent. Grouping 410 is able to create a dependency tree (e.g., linear relationship, clustering, etc.) based on the grouping of components. Each group will represent a list of components that cannot be restarted simultaneously, and components in different groups can be restarted simultaneously. Each component can only be part of one group. To automatically assign a component to a group when a restart is required, the algorithm leverages Kubernetes labels. Each Kubernetes deployment can have one or more labels defined in their spec, and the algorithm works off of a set of labels. For example, if a user may want deployments part of the same group called "appgroupA" not restart at once. Thus, the user will have the deployment specs for all those deployments to have a label "group: appgroupA" and when the algorithm tries to find a queue to put the deployment in for restart, it checks the "group" label and finds the queue for that group. The logic can have more than one labels and have groupings based on combinations using "or" and "and" operations. Other labels may include (see FIG. 6), "app: ui" and "app: backend".

As is further described herein below, Queue 420 has the capability of managing queues after the components have been grouped. How does Queue 420 manage grouped queues? Queue 420 leverages leverage the controller logic in a Kubernetes operator application. The custom Kubernetes controller implemented by the operator will detect a "create" or "update" event for specified Kubernetes resource types. The queue can be stored using any Kubernetes resource type (built-in or custom), such that the custom controller will detect a change in state of that resource. Note that if this implementation is used in a non-Kubernetes environment, then any mechanism of saving the state of the queue can be used (i.e., non-Kubernetes environment may not use a file to store the state of queue). For the disclosed embodiment, the state of the queue is maintained in a ConfigMap file. When a restart is requested for a deployment, request is added to a queue, which is stored in a restart ConfigMap. The restart ConfigMap to be used for this particular deployment is first determined using the label information (e.g., "app: ui", "app: backend", "group: appgroupA", etc.), which was described in the Grouping 410 section.

Queue 420:

In order to illustrate the functionality of Queue 420, an example will be provided. There is a deployment in a particular namespace within a Kubernetes cluster. If an event occurs such that a deployment requires a restart, then next step is to find out what queue does it belong to. See the pseudo-code/steps below:

For each deployment that needs to be restarted:
    Find the queue it belongs to
    If queue is not found, create a new one
    Add the deployment to the queue And then once the queues are updated by the above logic, following happens.

For each queue:
If queue is empty, do nothing.
Else:
Pop N deployments from queue.
Restart the deployments.
When deployments have restarted, repeat if more items in queue.

N is the number of deployments that can restart concurrently. If N is equal to one, then the deployments will truly be restarted sequentially by restarting one deployment at a time. If N is greater than one, then some deployments will restart simultaneously, but this could be beneficial for certain applications where a balance is required between efforts to reducing downtime while keeping the time it takes to restart an entire environment relatively low. "Pop" means to remove deployments from a queue.

Furthermore, when a restart is requested for a deployment, the request is added to a queue, which is stored in a restart ConfigMap. A restart request should contain the following information, but is not limited to, 1) the deployment to be restarted, 2) Status and 3) Timestamp of when request was last checked during a reconciliation of restart requests.

If the restart ConfigMap doesn't exist yet, the restart ConfigMap is created with an empty queue, and the request is added to the queue with a "Pending" status. If the restart ConfigMap exists, then the request is added to the existing queue with a "Pending" status, and the restart ConfigMap is updated. When the operator detects the creation or update of the restart ConfigMap, it will reconcile the restart request queue by emptying the queue of restarts one by one, thus "staggering" (or sequencing) the restart of deployment.

How does the operator reconcile restarts request? There are some pre-requisites that must be addressed. First, the operator's configuration should be provided with a list of labels to be considered for restart algorithm. For example, consider the following labels:

1) app: which defines the type of app that this deployment represents. A few example labels for app would be tenant-management, subscription-management, user-management, user interface, service-broker, and billing/
2) component: which defines the type of component this deployment represents. A few example labels for component would be security-services, ui-services, metering-services/

The second prerequisite is that the operator's configuration has N as number of restarts that can happen concurrently. Therefore, the operator will consider these to execute the queues concurrently. The third prerequisite, is that all the deployments in the system should have one or more labels added. For example, the deployments without any labels will be excluded from the algorithm.

Furthermore, when a deployment is flagged for restart then the following action/steps should occur (psedo-code):
1) Get the values of all the predefined labels for the deployment, let's say app:ui & component:customer1
2) Get the group name that this deployment should belong to, groupname="ui-customer1"
3) Check if a queue exists for the groupname:
   if queue does not exist, create the queue with the name as ""ui-customer1"".
4) Add the deployment to the queue for restart Additionally, when the restart ConfigMap is created or updated (which means the operator detects that the queue has been updated) then the following action/steps should occur (psedo-code):
If the queue is empty, do nothing.
Else:
  Get local copy of the restart configmap.
  For up to first N elements of queue, do:
  Check the state of the request.
  If request is in "Pending" state:
    Restart the deployment associated with this request.
    Set request status to "Waiting"
    Set request's timestamp for when it was last checked.
    Update the local copy of restart ConfigMap to reflect changes to the request in the queue.
  Else if the request is in "Waiting" state:
    Check if the component's deployment restarted.
    If the deployment has restarted:
      Set request status to "Completed"
      Remove the request from the queue.
      Update the local copy of restart ConfigMap to reflect changes to the queue.
    Else if the deployment has not yet restarted:
      Update the request's timestamp for when it was last checked (this is to trigger a restart ConfigMap updateevent detected by the operator, which will trigger a reconciliation of restart requests).
      Update the local copy of restart ConfigMap to reflect changes to the request in the queue.
  Done, for loop for N elements.
  Update the configmap on cluster with the updated local copy.

This approach allows for the operator to continue managing the application without having to poll for a deployment to restart. Each time the restart ConfigMap is restarted at the end of a restart request reconcile, the operator will detect the update and trigger another restart request reconcile.

Real world use case scenario:

An IBM® Blockchain platform will be used to illustrate a use case scenario that would benefit from the ability to sequentially restart workloads and leverage multiple queues to accommodate more complex restart restrictions. The IBM Blockchain Platform is a Kubernetes operator-based application that helps create and manage Hyperledger Fabric blockchain networks. Networks consist of Certificate Authority (CA), peer, and ordering service (orderer) components. A network can have one or more organizations, which consist of at least one CA, orderer, and peer. For a transaction to successfully go through in the network, at least one peer in the organization needs to be available, and more than 50% of the orderers need to be available. Peers and orderers cannot run as multiple replicas because they are stateful (i.e., requires a persistent storage) and have specific identities; therefore, each peer and orderer needs to be maintained as a single replica deployment.

To address the constraints of this use case, the following requirements are set for each component type. The CAs in a network need to be restarted sequentially if multiple require a restart at the same time. Peers within an organization need to be restarted sequentially, and N orderers within an organization need to be restarted sequentially (such that N is less than 50% of the number of orderers). A sample network might include the following:
Organization 1: 1 CA (org1ca), 3 orderers (org1orderer1, org1orderer2, org1orderer3), 2 peers (org1peer1, org1peer2)

Organization 2: 1, CA (org2ca), 3 orderers (org2orderer2, org2orderer2, org2orderer3), 2 peers (org2peer1, org2peer2)

The above deployments are labelled as follows:
org1ca—kind:ca, org: all
org1orderer1—kind:orderer, org: org1
org1orderer2—kind:orderer, org: org1
org1orderer3—kind:orderer, org: org1
org1peer1—kind:peer, org: org1
org1peer2—kind:peer, org: org1
org2ca—kind:ca, org: all
org2orderer1—kind:orderer, org: org2
org2orderer2—kind:orderer, org: org2
org2orderer3—kind:orderer, org: org2
org2peer1—kind:peer, org: org2
org2peer2—kind:peer, org: org2

If all the components in the above network need to be restarted at the same time, and using the describe approach above, the following behavior can be reproduced:

Within an organization, restarts can occur in parallel across component types. For example, org1ca, org2orderer1, and org1peer1 can all be restarted simultaneously.

Within an organization, peers should be restarted one at a time. For example, org1peer1 would be restarted first, then org1peer2 once org1peer1 has completed its restart process.

Within an organization, orderers should be restarted N at a time, such that less than 50% of orderers restart at once. For example, if N=1, org1orderer1 would be restarted first, then org1orderer2 once org1peer1 has completed its restart process.

Within a network, CAs should be restarted one at a time. For example, org1ca would be restarted first, then org2ca once org1ca has completed its restart process.

For the example network above, five queues would be required and working in parallel based on the label combinations for "kind" and "org". Thus, there are 3 values for org labels—org1, org2, all and 3 values for kind labels—ca, peer, orderer. Based on those values, the queues generated will be—org1-orderer, org2-orderer, all-orderer, org1-peer, org2-peer, all-peer, org1-ca, org2-ca, all-ca.

The application knows that CAs can restart all at once, ca is never assigned to org1 or org2 instead give it label of "all" when configuring & on the other end, org labels is always assigned to the peer and orderers. So only 5 of the queues will have members as shown below:

Queue 1(all-ca): contains restart requests for all CAs (regardless of their organization)

Queue 2(org1-peer): contains restart requests for all peers in org1

Queue 3(org2-peer): contains restart requests for all peers in org2

Queue 4(org1-orderer): contains restart requests for all orderers in org1

Queue 5(org1-orderer): contains restart requests for all orderers in org2

The above example is provided to better illustrate the invention working in a specific use case. How the invention is implemented may vary depending on the type of cloud infrastructure environment.

Figure 5:
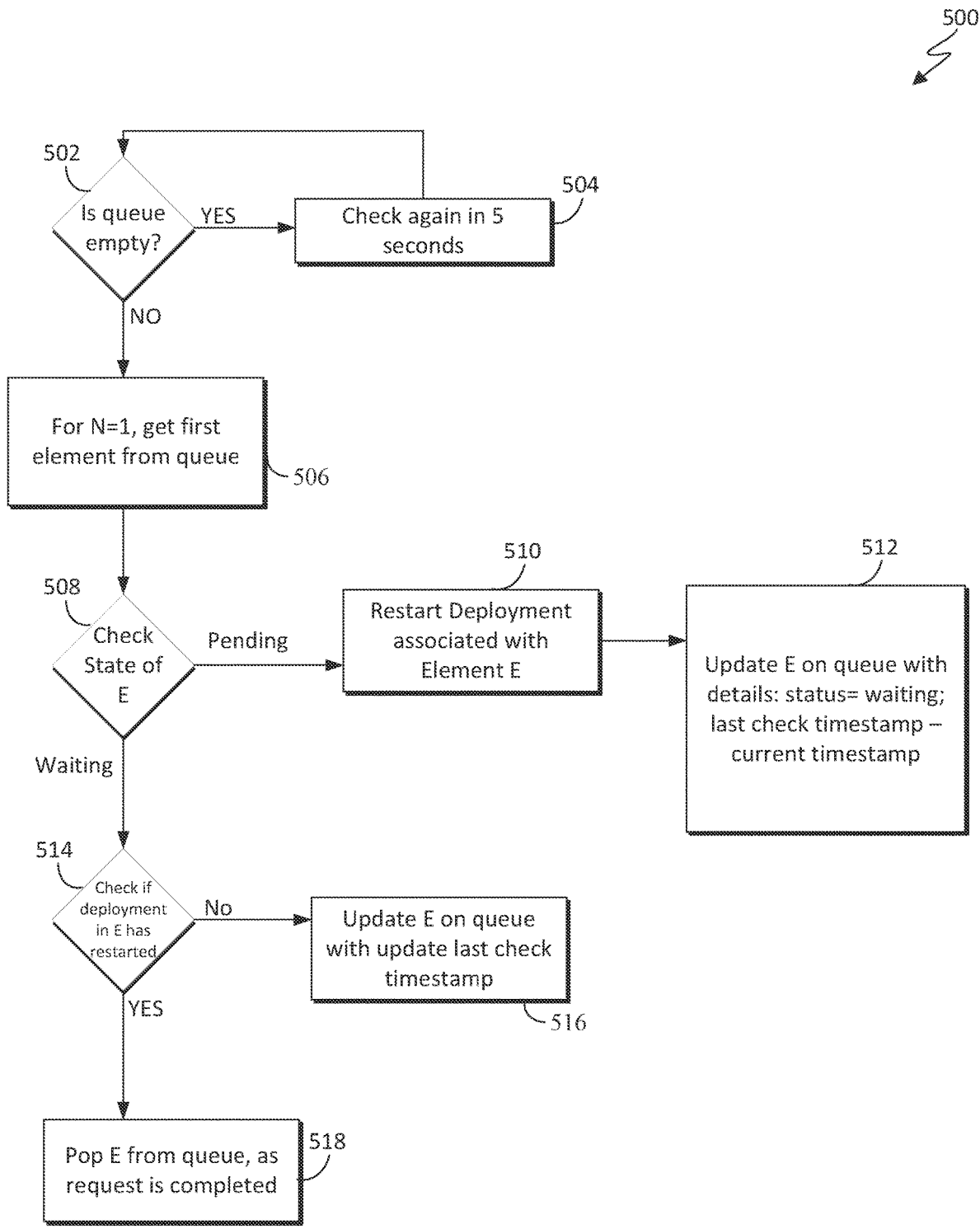
FIG. 5 depicts a high level generic flowchart illustrating the operation of workload management 96, in accordance with an embodiment of the present invention.

FIG. 5, designated as 500, depicts a high level generic flowchart illustrating the operation of workload management 96, in accordance with an embodiment of the present invention. The process starts at step 502 (decision block), wherein workload management 96 determines whether the queue is empty. If the queue is empty then workload management 96 checks the queue again in 5 seconds as step 504 (this duration can vary and can be customized based on the need of users). However, if the queue is not empty then proceed to step 506. In step 506, workload management 96 retrieves the first element (i.e., element E) from queue where N is the number of restarts that can happen concurrently). Moving down to the next step (step 508). In decision block 508, workload management 96 determine the status/state of element E. If the state of element E is "pending" then proceed to step 510. Otherwise, if the state of element E is "waiting" then proceed to decision block 514. In step 510, workload management 96 restarts the deployment associated with element E and update element E with the following queue details (step 512): i) status equals "waiting" and ii) last check timestamp equals current timestamp. In decision block 514, workload management 96 check to see if the deployment of element E has restarted or not (based on the "waiting" status of element E). If workload management 96 has determined that deployment of element E has restarted then workload management 96 pops (i.e., remove) element E from the queue since the request has now completed (step 518). However, if the deployment of element E has not restarted then workload management 96 would update element E with the last check timestamp as step 516. It may be easier to follow the above flowchart by reading over the next illustration in FIG. 6.

Figure 6:
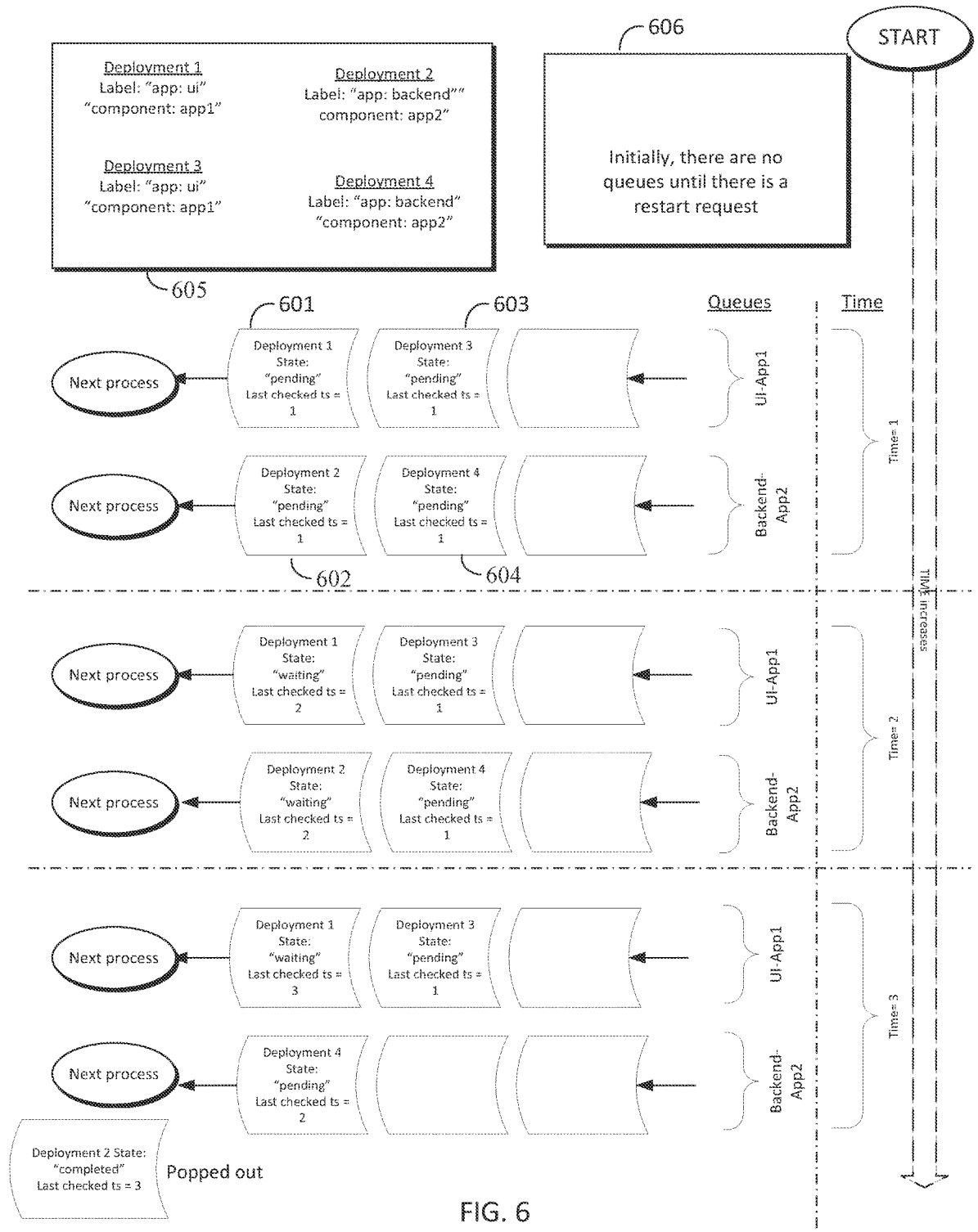
FIG. 6 depicts an example of multiple deployments and managing of queue.

FIG. 6 depicts an example of multiple deployments and managing of queue. In the following example, there are four deployments, deployment 1 as 601, deployment 2 as 602, deployment 3 as 603 and deployment 4 as 604 (see block 605). These deployments are in two separate queues based on their labels. Recall from the functionality of Grouping 410 is the ability to group requests based on the labels. Thus, 601 and 603 are grouped together due to their similar labels, "app: ui" and "component: app1 and app2".

Initially, there are no queues (606) until there is a request for restarts. When deployment 1 appears for a restart then "UI-app1" queue is generated and deployment 1 is added to it. When deployment 2 appears for a restart then "Backend-App2" queue is generated and deployment 2 is added to it. Similarly, deployment 3 and deployment 4 are added to the appropriate queue based on the labels. Thus, deployment 1 and deployment 3 are in queue called "UI-App 1" and deployment 2 and deployment 4 are in queue, called "Backend-App2." The rightmost portion of the Figure shows "time" increasing from 1 all the way to 6 (for the purpose of this example).

Thus, at time equals to zero (not shown in the example), there are no queues. Queues are created whenever a request for a restart is received. Thus, at time equal to 1, two queues are created and four deployment exists in the two queues (e.g., UI-App1 and Backend-App2).

As time progresses, the state/status of each deployment changes from "pending" to "waiting" depending on the position in the queue. For example, deployment 1 and deployment 2 were both created and assigned to two different queues at the same time. At a later time after the assignment of deployment 1 and deployment 2, deployment 3 and deployment 4 request appeared and were assigned to follow deployment 1 and deployment 2, respectively. Thus, deployment 1 and deployment 2 would be the first to be "processed" by workload management 96. Hence, at timestamp equal to 2, the status of deployment 1 and deployment 2 changes from "pending" to "waiting".

When timestamp equals to three, workload management 96 completes the restart for deployment 2 (which is now "popped" out from the queue) and the status of deployment 2 is changed from "waiting" to "completed." This process is repeated for the rest of deployments until there are no deployments left in the queue at timestamp equal to 6.

Figure 7:
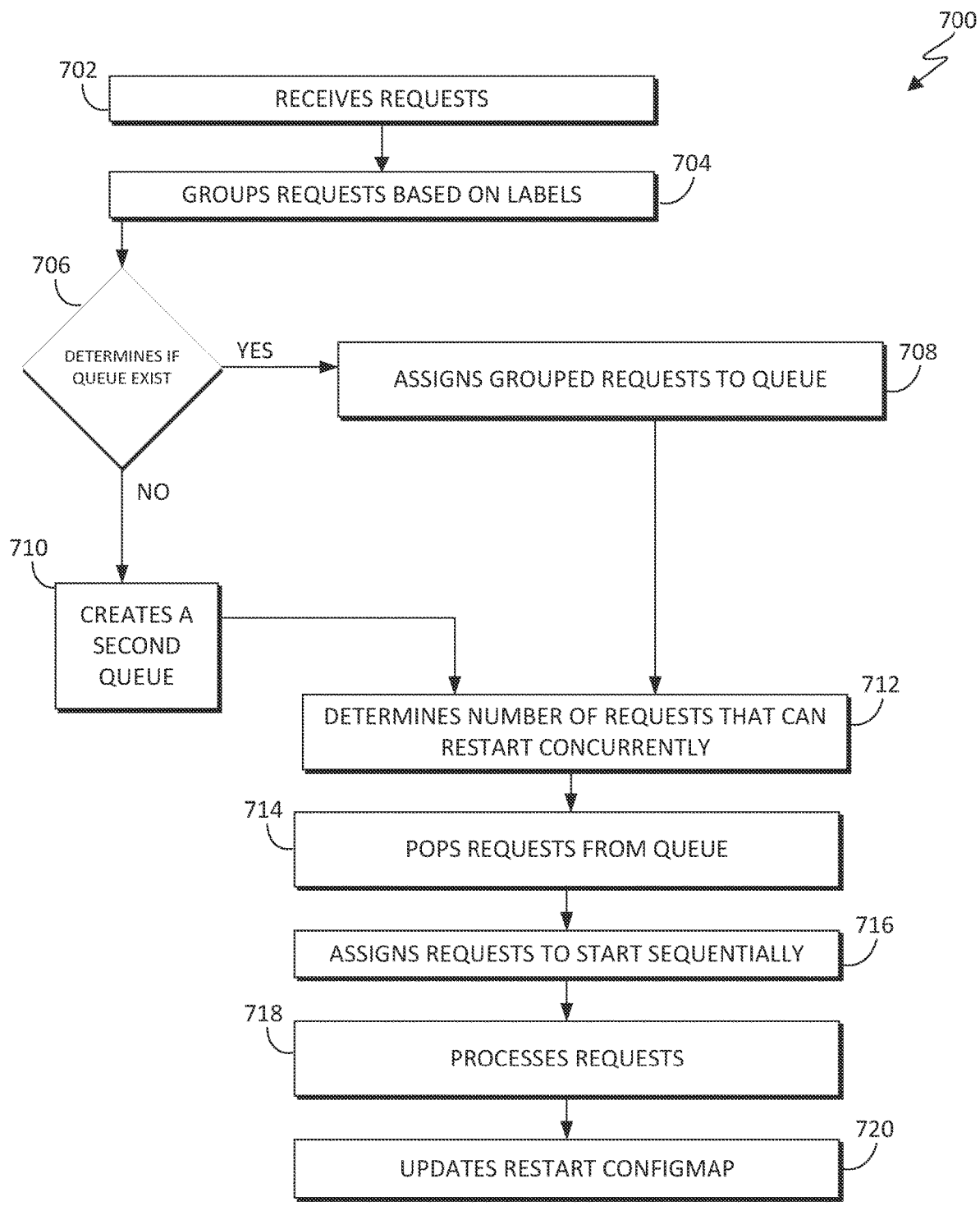
FIG. 7 is a high-level flowchart illustrating the operation of workload management 96, designated as 700, in accordance with another embodiment of the present invention.

FIG. 7 is a high-level flowchart illustrating the operation of workload management 96, designated as 700, in accordance with another embodiment of the present invention.

Workload management 96 receives deployment requests associated with a deployment of one or more services and/or one or more application (step 702). The requests to restart are from various applications associated to one or more server clusters.

Workload management 96 groups the requests based labels (step 704). Workload management 96, through Grouping 410, groups the restart requests into various queues based on the labels. For example, if a user may want deployments part of the same group called "appgroupA" not restart at once. Thus, the user will have the deployment specs for all those deployments to have a label "group: appgroupA" and when the algorithm tries to find a queue to put the deployment in for restart, it checks the "group" label and finds the queue for that group. The logic can have more than one labels and have groupings based on combinations using "or" and "and" operations.

Workload management 96 determines if the queue exist for the group (step 706). If the queue (i.e., first/initial queue) doesn't exist for the requests (i.e., doesn't match or have labels with similar naming convention) then a queue is created with a label that matches/corresponds to the request. For example, (see FIG. 6.) If there were deployment requests with label, "app: backend" and a queue doesn't exist with that name, workload management 96 will create that queue to group requests with the label's app equal to backend.

Workload management 96 assigns grouped requests to the relevant queue (step 708). Assuming that the first request has the same or similar label as the existing queue, workload management 96 will assign the first request to the existing queue. For example, if the request has a label of "app: backend and component: app2" and a queue with the similar name convention, "Backend-App2" already exist then the request will be assigned to that existing queue. Otherwise, workload management 96 will create a second queue (step 710) if the label for the request is "app: ui" and "component: app1" The second queue will be appropriately label as "UI-App1."

Workload management 96 determines the number of requests that can restart concurrently (step 712). A variable N, is used to keep count of the total number of requests for a restart that can be executed concurrently. A concurrent threshold value is value that is set by the user to determine how many requests should be excluded from the queue (i.e., bypass the queue and the restart command can be executed immediately without tying up the queue). For example, if concurrent threshold value is set to "1" and if N is greater than "1" then the request for deployments can be restarted sequentially one at a time (see FIG. 7).

Workload management 96 pops requests from the queue (step 714). If there are requests that does not need to be assigned to a queue (i.e., can restart concurrently and no dependency) then it can and will be removed from the queue.

Workload management 96 assigns requests to start sequentially (step 716). All remaining requests that have not been popped out of the queue will be assigned to designated queues based on the labels.

Workload management 96 processes the request (step 718). The remaining requests in the queues will be processed in a sequential order. See verbiage from FIG. 6 on how workload processes deployment requests.

Workload management 96 updates the restart configmap file (step 720). As previously mentioned at the beginning of the specifications that examples of embodiments will refer to a Kubernetes environment deployment. However, users may rely on non-Kubernetes environment to implement the same solution (i.e., minimize downtime with restarts). Thus, within a Kubernetes platform, there is a configmap file kept to dynamically maintain statuses of requests within the queues. If the restart ConfigMap doesn't exist yet, the restart ConfigMap is created with an empty queue, and the request is added to the queue with a "Pending" status. If the restart ConfigMap exists, then the request is added to the existing queue with a "Pending" status, and the restart ConfigMap is updated. When the operator detects the creation or update of the restart ConfigMap, it will reconcile the restart request queue by emptying the queue of restarts one by one, thus "staggering" (or sequencing) the restart of deployment.

What is claimed is:

1. A computer-implemented method for managing requests for a restart associated with deployments in one or more server clusters, comprising:
   receiving one or more requests for a restart relating to deployments associated with the one or more server clusters, wherein the one or more requests includes a request name and one or more restart configmap files;
   grouping, by a grouping sub-module, the one or more requests based on the request name against a first group label of one or more group labels, wherein the one or more labels are defined by a deployment specification, further comprising:
      identifying the one or more group labels that were initially assigned by one or more server clusters to the one or more requests; and
      assigning the one or more requests to one or more deployment queues based on matched group labels of the one or more group labels between the one or more requests and the one or more deployment queues;
   determining, by a deployment queue sub-module, whether a first deployment queue of the one or more deployment queues exist, wherein the first deployment queue matches with the first group label;
   responsive to the first deployment queue does exist then assigning, by the deployment queue sub-module, the one or more grouped requests to the first deployment queue, wherein the request name matches the first group label;
   responsive to the first deployment queue does not exist then creating a deployment queue based on the first group label and assigning the one or more requests that has been grouped by the first group label to the deployment queue;
   determining, by the deployment queue sub-module, within each of the one or more deployment queues whether a concurrent counter has exceeded a concurrent threshold value, wherein the concurrent counter is counter that keeps track of total number of requests for restarts for each queue of the one or more deployment queues that can be executed concurrently and the concurrent threshold value has been predetermined by a user and the concurrent threshold value is a value that determines how many request should be excluded from the queue, such that the requests bypasses the queue and a restart command can be executed immediately;

in response to the concurrent counter has exceeded a concurrent threshold value, popping, by the deployment queue sub-module, the one or more requests for a restart, wherein the number of the one or more requests equals to a value of the concurrent counter from each of the one or more deployment queues;

in response to the concurrent counter has not exceeded a concurrent threshold value, assigning, by the deployment queue sub-module, each of the one or more requests in the deployment queues to start sequentially based on the one or more group labels;

processing, by the deployment queue sub-module, remainder of the one or more requests that cannot start concurrently based on status and a timestamp of the one or more requests; and updating, by the deployment queue sub-module, the one or more restart configmap files with a "complete" status value.

2. The computer-implemented method of claim 1, wherein the one or more restart configmap files are system configuration files that contain statuses of restart requests for each queues.

3. The computer-implemented method of claim 1, wherein popping the one or more requests comprises of removing the one or more requests from the one or more deployment queues.

4. The computer-implemented method of claim 1, wherein the grouping sub-module is configured to detect and define grouping associations with one or more deployment queues based in dependencies of the one or more requests.

5. The computer-implemented method of claim 1, wherein the queue sub-module is configured to manage, at least, restarting and processing the one or more requests for a restart relating to deployments.

6. The computer-implemented method of claim 1, wherein processing the one or more requests from the first deployment queue and a second deployment queue based on status and a timestamp of the one or more requests, further comprises:
    identifying the status and the timestamp of the one or more requests;
    determining if the status equals to pending, restarting the one or more request from the first or second queue and updating the status to completed; and
identifying the status and the timestamp of the one or more requests remaining in the one or more deployment queues and updating the status from pending to waiting.

7. A computer program product for managing requests for a restart associated with workload deployment in one or more server clusters, the computer program product comprising:
    one or more computer readable storage media having computer-readable program instructions stored on the one or more computer readable storage media, said program instructions executes a computer-implemented method comprising steps of:
        receiving one or more requests for a restart relating to deployments associated with the one or more server clusters, wherein the one or more requests includes a request name and one or more restart configmap files;
        grouping, by a grouping sub-module, the one or more requests based on the request name against a first group label of one or more group labels, wherein the one or more labels are defined by a deployment specification, further comprising:
            identifying the one or more group labels that were initially assigned by one or more server clusters to the one or more requests; and
            assigning the one or more requests to one or more deployment queues based on matched group labels of the one or more group labels between the one or more requests and the one or more deployment queues;
        determining, by a deployment queue sub-module, whether a first deployment queue of the one or more deployment queues exist, wherein the first deployment queue matches with the first group label;
        responsive to the first deployment queue does exist then assigning, by the deployment queue sub-module, the one or more grouped requests to the first deployment queue, wherein the request name matches the first group label;
        responsive to the first deployment queue does not exist then creating a deployment queue based on the first group label and assigning the one or more requests that has been grouped by the first group label to the deployment queue;
        determining, by the deployment queue sub-module, within each of the one or more deployment queues whether a concurrent counter has exceeded a concurrent threshold value, wherein the concurrent counter is counter that keeps track of total number of requests for restarts for each queue of the one or more deployment queues that can be executed concurrently and the concurrent threshold value has been predetermined by a user and the concurrent threshold value is a value that determines how many request should be excluded from the queue, such that the requests bypasses the queue and a restart command can be executed immediately;
        in response to the concurrent counter has exceeded a concurrent threshold value, popping, by the deployment queue sub-module, the one or more requests for a restart, wherein the number of the one or more requests equals to a value of the concurrent counter from each of the one or more deployment queues;
        in response to the concurrent counter has not exceeded a concurrent threshold value, assigning, by the deployment queue sub-module, each of the one or more requests in the deployment queues to start sequentially based on the one or more group labels;
        processing, by the deployment queue sub-module, remainder of the one or more requests that cannot start concurrently based on status and a timestamp of the one or more requests; and
        updating, by the deployment queue sub-module, the one or more restart configmap files with a "complete" status value.

8. The computer program product of claim 7, wherein the one or more restart configmap files are system configuration files that contain statuses of restart.

9. The computer program product of claim 7, wherein popping the one or more requests comprises of removing the one or more requests from the one or more deployment queues.

10. The computer program product of claim 7, wherein the grouping sub-module is configured to detect and define grouping associations with one or more deployment queues based in dependencies of the one or more requests.

11. The computer program product of claim 7, wherein the queue sub-module is configured to manage, at least, restarting and processing the one or more requests for a restart relating to the deployment.

12. The computer program product of claim 7, wherein processing the one or more requests from the first deployment queue and a second deployment queue based on status and a timestamp of the one or more requests, further comprises:
  identifying the status and the timestamp of the one or more requests;
  determining if the status equals to pending, restarting the one or more request from the first or second queue and updating the status to completed; and
  identifying the status and the timestamp of the one or more requests remaining in the one or more deployment queues and updating the status from pending to waiting.

13. A computer system for managing requests for a restart associated with workload deployment in one or more server clusters, the computer system comprising:
  one or more computer processors;
  one or more computer readable storage media;
  one or more computer readable storage media having computer-readable program instructions stored on the one or more computer readable storage media for execution by at least one of the one or more computer processors, said program instructions executes a computer-implemented method comprising steps of:
    receiving one or more requests for a restart relating to deployments associated with the one or more server clusters, wherein the one or more requests includes a request name and one or more restart configmap files;
    grouping, by a grouping sub-module, the one or more requests based on the request name against a first group label of one or more group labels, wherein the one or more labels are defined by a deployment specification, further comprising:
      identifying the one or more group labels that were initially assigned by one or more server clusters to the one or more requests; and
      assigning the one or more requests to one or more deployment queues based on matched group labels of the one or more group labels between the one or more requests and the one or more deployment queues;
    determining, by a deployment queue sub-module, whether a first deployment queue of the one or more deployment queues exist, wherein the first deployment queue matches with the first group label;
    responsive to the first deployment queue does exist then assigning, by the deployment queue sub-module, the one or more grouped requests to the first deployment queue, wherein the request name matches the first group label;
    responsive to the first deployment queue does not exist then creating a deployment queue based on the first group label and assigning the one or more requests that has been grouped by the first group label to the deployment queue;
    determining, by the deployment queue sub-module, within each of the one or more deployment queues whether a concurrent counter has exceeded a concurrent threshold value, wherein the concurrent counter is counter that keeps track of total number of requests for restarts for each queue of the one or more deployment queues that can be executed concurrently and the concurrent threshold value has been predetermined by a user and the concurrent threshold value is a value that determines how many request should be excluded from the queue, such that the requests bypasses the queue and a restart command can be executed immediately;
    in response to the concurrent counter has exceeded a concurrent threshold value, popping, by the deployment queue sub-module, the one or more requests for a restart, wherein the number of the one or more requests equals to a value of the concurrent counter from each of the one or more deployment queues;
    in response to the concurrent counter has not exceeded a concurrent threshold value, assigning, by the deployment queue sub-module, each of the one or more requests in the deployment queues to start sequentially based on the one or more group labels;
    processing, by the deployment queue sub-module, remainder of the one or more requests that cannot start concurrently based on status and a timestamp of the one or more requests; and
    updating, by the deployment queue sub-module, the one or more restart configmap files with a "complete" status value.

14. The computer system of claim 13, wherein the one or more restart configmap files are system configuration files that contain statuses of restart.

15. The computer system of claim 13, wherein popping the one or more requests comprises of removing the one or more requests from the one or more deployment queues.

16. The computer system of claim 13, wherein the grouping sub-module is configured to detect and define grouping associations with one or more deployment queues based in dependencies of the one or more requests.

17. The computer system of claim 13, wherein processing the one or more requests from the first deployment queue and a second deployment queue based on status and a timestamp of the one or more requests, further comprises:
  identifying the status and the timestamp of the one or more requests;
  determining if the status equals to pending, restarting the one or more request from the first or second queue and updating the status to completed; and
identifying the status and the timestamp of the one or more requests remaining in the one or more deployment queues and updating the status from pending to waiting.

* * * * *